United States Patent
Komitov et al.

(10) Patent No.: US 7,916,255 B2
(45) Date of Patent: Mar. 29, 2011

(54) CHOLESTERIC LIQUID CRYSTAL DISPLAY (LCD) DEVICE, AND METHOD FOR ITS PRODUCTION

(76) Inventors: Lachezar Komitov, Göteborg (SE); Andriy Kozachenko, Mölndal (SE)

( * ) Notice: Subject to any disclaimer, the term of this patent is extended or adjusted under 35 U.S.C. 154(b) by 958 days.

(21) Appl. No.: 11/665,542

(22) PCT Filed: Oct. 18, 2005

(86) PCT No.: PCT/EP2005/011187
§ 371 (c)(1),
(2), (4) Date: May 17, 2007

(87) PCT Pub. No.: WO2006/042737
PCT Pub. Date: Apr. 27, 2006

(65) Prior Publication Data
US 2007/0292633 A1    Dec. 20, 2007

(30) Foreign Application Priority Data

Oct. 18, 2004    (EP) .................................... 04024754

(51) Int. Cl.
G02F 1/1337    (2006.01)
H01L 21/00    (2006.01)
G02F 1/1333    (2006.01)
G02F 1/1343    (2006.01)

(52) U.S. Cl. .......... 349/123; 349/124; 349/187; 438/30; 428/1.3; 156/379.7

(58) Field of Classification Search .................. 385/115, 385/123, 124, 139, 143, 147, 175, 176, 158, 385/187, 185; 349/115, 123, 124, 139, 143, 147, 175, 176, 158, 187, 185; 438/30; 428/1.3; 156/379.7

See application file for complete search history.

(56) References Cited

U.S. PATENT DOCUMENTS

| 4,286,266 | A |   | 8/1981 | De Zwart et al. |
| 5,920,364 | A | * | 7/1999 | Akins et al. .................... 349/110 |
| 6,166,797 | A | * | 12/2000 | Bruzzone et al. ............. 349/155 |
| 6,377,321 | B1 | * | 4/2002 | Khan et al. ....................... 349/35 |
| 2004/0165135 | A1 | * | 8/2004 | Jones et al. .................... 349/142 |
| 2007/0292633 | A1 | * | 12/2007 | Komitov et al. ............... 428/1.3 |

FOREIGN PATENT DOCUMENTS

| EP | 1 209 512 A | 5/2002 |
| EP | 1 239 324 A | 9/2002 |

* cited by examiner

*Primary Examiner* — Brian M Healy
(74) *Attorney, Agent, or Firm* — Buchanan Ingersoll & Rooney PC (57) ABSTRACT

A liquid crystal device is provided, having one or several display segments, a first display substrate, a second display substrate, a layer of liquid crystal material disposed between the first and second substrate; and layer of conductive material disposed on the substrates. The conductive layers form electrodes for applying an electric field across the liquid crystal for switching the liquid crystal material between a first optical state and a second optical state different from the first optical state. Image features of the display are further defined by the inclusion of a layer of patterned non-conductive or passive dielectric material on at least one of the substrates, the patterned material forming a mask defining image elements of the display segments.

20 Claims, 6 Drawing Sheets

CHOLESTERIC LIQUID CRYSTAL DISPLAY (LCD) DEVICE, AND METHOD FOR ITS PRODUCTION

FIELD OF THE INVENTION

The present invention relates to a cholesteric liquid crystal device (LCD) with at least one display segment, and specifically a so-called stabilized cholesteric texture (SSCT) LCD. Preferably the cholesteric liquid crystals belong to a chiral nematic N* class, and substantially polymer free. Further, the invention relates to a method for producing such a liquid crystal device and for use of the device.

BACKGROUND OF THE INVENTION

Cholesteric liquid crystal displays (LCD) have been extensively investigated during the past decade for commercial applications. That solid research has in large arisen from a number of very attractive and potentially profitable applications like portable electronic appliances, including computers and wireless telecommunications devices, electronic books, document viewers, electronic newspapers, portable document assistants etc.

Further, a special attention has been dedicated to the so-called surface stabilized cholesteric texture (SSCT) due to their unique property of bistability and absence of polarizers. Such kind of display mode, if designed to be reflective for short pitch SSCT, in itself is sun readable and consumes no power for information storage. These properties in combination with the technological manufacturing simplicity of SSCT LCDs challenge the existing workhorse of LCD technologies and are considered capable to replace the existing LCD technologies at least in part. SSCT LCD technology is simpler than the conventional twisted nematic (TN) technology and is manufactured by similar manufacturing steps. As the major share of world LCD market is subdivided onto two basic segments: high information content big TFT displays capable of moving images with TV rates and lower information content passive matrix LCDs involving alphanumeric displays, the present invention primarily relates to the last ones. Although, SSCT displays are proven to operate both with TV rates (U.S. Pat. No. 5,661,533) and high number of multiplexing groups (U.S. Pat. No. 5,748,277), the technology for bulk production is immature for today. Conventionally, SSCT operates in the reflective optical mode offering switching between the optically reflective polydomain planar cholesteric texture, optically slightly scattering focal conic texture and transparent electric field induced homeotropic state. The former two optical states as well as their combination in any portion (gray shades) could be stable at zero fields provided special boundary conditions are arranged.

However, there are several major problems to be solved underway to the wide commercialization of SSCT. One of the major problems is insufficiently high voltage for dielectric breakdown of internal black masks in short pitch SSCT LCDs as well as shock sensitivity and mechanical stability of cholesteric texture. The original molecular order of cholesteric texture, if it is stabilized by surface, is easy to destroy just by mechanical deformation when no electric field is applied. This problem is partially solved when cholesteric texture is stabilized in volume by adding certain amount of polymer into cholesteric liquid crystal (LC) composition following subsequent polymerization in display cell (U.S. Pat. Nos. 5,570,216; 5,636,044). Although, the method works, such production of polymer stabilized cholesteric LCDs is hardly fit for mass production. In case of SSCT liquid crystal bulk is influenced mainly by the externally applied electric (magnetic) fields and to a much lower extent by the surface, which is amorphous dielectric in most cases. Both TN/STN and SSCT displays have a sandwich structure and are controlled via the dielectric coupling at the cross section of designated patterned conductive electrodes. Such display design represents alternation of dielectric and conductive sites. An example of a previously known patterning of the electrode in static driven SSCT is e.g. disclosed in WO 2004/021077A1. The size of dielectric sites may be very large, especially for alphanumeric display design. This creates a problem for SSCT since uncontrollable sites may represent artifacts due to shock sensitivity. Unlike TN, where original LC texture uniformity is achieved due to the alignment layers treatment in uncontrolled areas, SSCT would not show any uniformity in electrode free area. As a result, the uncontrollable sites must be covered with a dark opaque mask. A black layer is also normally used behind the sandwich to allow the absorption of all transmitted light. The necessity of such a black mask is at least partly responsible for the drastic display price increase and usually may be performed in at least two different ways: vacuum deposition of dielectrics (for example Ge following subsequent high temperature oxidation to GeO) and spin coating of black polyimide layer following subsequent selective exposure and wet bench processing. Although, the last technique seems to be very simple, it significantly influence the reliability of display operation at high electric fields, due to dielectric breakdown of black polyimides, which is conventionally the case in short pitch SSCT.

There is therefore a need for a liquid crystal device (LCD), and specifically a so-called stabilized cholesteric texture (SSCT) LCD, which is easier and/or more cost-effective to produce, and/or which provides better technical qualities, such as shock resistance and image quality, than heretofore known devices.

SUMMARY OF THE INVENTION

It is therefore an object of the present invention to provide a liquid crystal device (LCD), and a method for production and operation of the same, which alleviates at least part of the above-related disadvantages and problems of the prior art.

This object is achieved with a liquid crystal device and a method according to the appended claims.

Inter alia, the present invention suggests a new concept in cholesteric LCD design. The main idea lies in the very fact that both focal conic and planar texture could be controlled using some peculiarities of surface interactions of LC molecules with a solid boundary. Broadly, the present invention pertains to a liquid crystal device, a method for producing such a liquid crystal device and a principle of electronic driving for such display device, where a conductive electrode could remain essentially unpatterned and the displaying image is formed by patterning of the alignment layer(s). This and other objects are achieved according to the appended claims.

According to a first aspect of the invention, there is provided a liquid crystal device with at least one display segment, comprising:

a first transparent display substrate including a layer of patterned non-conductive or passive dielectric material thereon, said patterned material forming a mask defining image elements of the display segments, wherein said display segments comprise at least part of an image to be presented on said display;

a second display substrate;

a layer of cholesteric liquid crystal material disposed between said first and second substrate; and a layer of conductive material arranged on each of said substrates, said conductive layers forming electrodes for applying an electric field across the liquid crystal for providing switching in the liquid crystal material between at least two different optical states. In this arrangement, the electrodes of the conductive layers and the mask of said first transparent display substrate are arranged to at least partly overlap each other.

The mask pattern is arranged on the first substrate, but it is also possible to arrange a mask pattern on the second substrate. In such an embodiment, these mask patterns may be arranged complementary to each other, in an overlapping or non-overlapping fashion. Further, a sequence of layers of patterned non-conductive or passive dielectric material with different image patterns may be provided stacked over each other to form a three dimensional relief.

Preferably, the layers of conductive material is arranged as a coating on the side of the substrates facing the cholesteric liquid crystal material, and the layer of patterned non-conductive or passive dielectric material of the first substrate being arranged between the layer of conductive layer and the layer of cholesteric liquid crystal. It is further preferred that the cholesteric liquid crystal material is substantially free of polymer additives.

It has surprisingly been found by the present inventors that by arranging a non-conductive or passive dielectric pattern on the substrate, and preferably in the alignment layer on the boundary to the liquid crystal material, patterning of a conductive electrode could be avoided, or at least be made much simpler, and consequently easier and less costly to achieve. Further, such patterning on the substrate is much easier and more cost-effective to accomplish than conventional patterning of the electrode. This is due to the fact that easier manufacturing steps could be used, and that fewer of the production steps need expensive processing facilities, such as clean rooms.

Still further, the new design provides an LCD with improved shock resistance, and excellent possibilities to control the pattern, and consequently also the resulting image.

The liquid crystal device could be used for essentially any application in which it is known to use LCDs, and in particular SSCT LCDs. However, the inventive liquid crystal device is especially useful for displays having a limited number of different predetermined images or image elements to be displayed, such as alphanumerical displays, electronic signs, electronic books, billboards and other types of static drive, low multiplexing reflective cholesteric LCDs with intrinsic memory, etc.

Generally, the new concept of SSCT LCD design employs an idea of solid or essentially unpatterned electrode, where the whole area of liquid crystal layer is controlled by an electric field. As in conventional SSCT, the display image of the present invention is formed as an optical contrast between focal conic and planar textures, which both could be controlled using properties of surface interactions of LC molecules with the solid boundary. For example, such factor as a type of molecular alignment at the interface may result in changes of critical field for cholesteric-nematic (CN) transition $E_{CN}$ depending on molecular configuration at the boundary. The gap between critical CN transition fields for planar and homeotropic alignment is quite significant and could be achieved in the range 5-15% $E_{CN}$, depending on cholesteric pitch-to-cell gap ratio. It is well known in the art that homeotropic alignment facilitates the unwinding process. Another type of surface interactions can be associated with the appropriate surface treatment. For example, the same alignment layer may produce various relaxation properties of cholesteric liquid crystals before and after surface treatment. It is known that the reverse nematic to cholesteric (NC) transition is a nucleation phenomenon. The nucleation velocity has been found to be in a strong dependence from nucleation sites concentration. The nucleation sites surface density for the different alignment layers could be changed by appropriate surface treatment resulting in the temporal gap between relaxation from homeotropic to focal conic texture. Experimental results show that it is possible to achieve at least an order of magnitude difference in nucleation velocity hereby. Finally, the presence of an additional non-conductive or passive dielectric layer, preferably arranged in the alignment layer, may play the role of passive dielectric layer, which introduce the dielectric losses and hereby selectively diminish the electric field applied to LC layer.

With the new liquid crystal device, it is possible to decrease the need for patterning of the transparent electrodes and thereby to avoid using the complicated and expensive wet processes used for such patterning. Instead of electrode patterning a substrate layer is patterned, but allowing the electrodes to be solid, or at least with only a simple pattern which could be accomplished with easier methods. From the technological point of view the provision of a non-conductive or passive dielectric layer in the substrate, e.g. by means of surface patterning, is much simpler and faster than electrode patterning. No photolithography is e.g. needed. Using the new concept the number of technological operations in the manufacturing process is drastically reduced, especially for SSCT LCD. By employing the principle of surface patterning instead of electrode patterning, the number of technological steps in the manufacturing process is drastically reduced, particularly for SSCT LCDs.

In one line of embodiments, the layer of patterned non-conductive or passive dielectric material is formed as a separate layer on the substrate surface, the rest of the substrate being of a different material.

In an alternative line of embodiments the layer of patterned non-conductive or passive dielectric material is formed as a surface modification of the substrate.

The surface patterning can be performed utilizing conventional offset printing, silk screen or inkjet printing techniques depending on manufacturing capacity. Either technique, as rule, is already present in LCD manufacturing facilities resulting in no additional investments in the equipment for technology adoption. Additionally, the new design could further be simplified by integrating the pattern in the substrate, preferably in the alignment layer, by selectively modifying the surface of the substrate. Such a selective modification could be accomplished in different manners, e.g. mechanically, chemically (electrochemically, photochemically), physical (thermal, plasma or vacuum) etc.

Preferably, at least one of the layers of conductive material disposed on said substrates comprises an essentially un-patterned area, and preferably forms an essentially solid electrode area. In applications where the liquid crystal device has a plurality of display segments, it is preferred that at least one of the layers of conductive material disposed on said substrates comprises several essentially un-patterned electrode areas, said electrode areas preferably covering essentially the whole area of said display segments, wherein the electrode areas are independently controllable in order to control different display segments.

In its basic and simplest framework the new liquid crystal device needs no electrode patterning. The typical example of such an application is a binary segment electrically controlled image like tablet. More complex electrically controlled image e.g. alphanumeric displays are composed of a set of separate binary segments and therefore such display design requires electrode patterning. However, unlike conventional TN LCD design, where both upper and lower electrodes are supposed to be patterned, the new design works well with a patterned electrode on only one of the substrates, i.e. either the upper or the lower substrate. Further, this patterning could be achieved comparably easy. For example, thin dielectric stripes sufficient to separate the neighboring electrically conductive areas could be arranged in the electrode area. The pattern could preferably be provided by laser patterning technique, since the patterning square is very small with respect to the whole display square. Such a patterning has several benefits with respect to a conventional wet process patterning. First of all, laser patterning represents completely dry process, which is insensitive to the environment conditions like dust and contamination particles. It could be performed out of clean room facility resulting in significant savings, due to less use of expensive clean room facilities and significant yield increase. Secondly, laser patterning requires less expensive equipment and often allows faster substrate processing, especially for less complex patterns.

The inventive liquid crystal device is expected to be particularly useful for static drive or low multiplexing level reflective cholesteric LCDs, LCDs with intrinsic memory, and patterned surface matrix type reflective cholesteric LCDs with fast addressing and gray scale.

The liquid crystal material is preferably a cholesteric, preferably chiral nematic, liquid crystal material, and preferably substantially free of polymer additives. Further, the liquid crystal material is preferably arranged to form, in display cells, at least two stable states at zero field: planar and focal conic, which could be transformed by external electric field. Preferably, the volume content of polymer additives in the cholesteric liquid crystal material is less than 5%, and preferably less than 1%, and most preferably less than 0.1%.

The display substrates are preferably fabricated of material selected from the group consisting of glass, plastic, quartz, ceramics, polymeric materials, and other composite materials, as well as combinations thereof.

Optionally, an essentially light absorbing layer could be arranged either between the conductive layer and the alignment layer of the bottom substrate, or behind the bottom substrate, for display operation in a reflective mode.

Further, the liquid crystal device preferably comprises at least one intermediate alignment layer provided between the layer of cholesteric liquid crystal material and the display substrate(s).

It is also preferred that the layers of conductive material are covered with at least one alignment layer and assembled in a sandwich construction with the layer of patterned non-conductive or passive dielectric material arranged to face the layer of cholesteric liquid crystal material.

Still further, the layer of patterned non-conductive or passive dielectric material is preferably arranged in direct contact with the layer of cholesteric liquid crystal material and further arranged to modify the anchoring properties of at least one of the electrodes in relation to the cholesteric liquid crystal material.

According to another aspect of the invention, there is provided a method of making a liquid crystal device having at least one display segment, comprising the steps:
  providing first and second display substrates;
  disposing a layer of conductive material on said substrates, said conductive layers forming electrodes for applying an electric field across a liquid crystal for switching the liquid crystal material between at least two different optical states
  arranging a layer of patterned non-conductive or passive dielectric material in one of said substrates, said patterned material forming a mask defining image element of the display segments, wherein said display segments comprise at least part of an image to be presented on said display; and
  disposing a layer of cholesteric liquid crystal material between said first and second substrate,
  wherein the electrodes of the conductive layers and the mask of said substrate are arranged to at least partly overlap each other. According to still another aspect of the invention, there is provided a use as a display of the liquid crystal device as discussed in the foregoing, wherein the use comprises applying of a driving voltage on the device employing a difference between the critical field for cholesteric-nematic transition for differently patterned areas of the display. Alternatively, the use could comprise applying of a driving voltage on the device employing hysteresis properties and a difference in nucleation velocity for reverse nematic to cholesteric transition for differently patterned areas of the display.

These and other aspects of the invention will be apparent from and elucidated with reference to the embodiments described hereinafter.

BRIEF DESCRIPTION OF THE DRAWINGS

For exemplifying purposes, the invention will be described in closer detail in the following with reference to embodiments thereof illustrated in the attached drawings, wherein:

FIG. 3b is a top view of the patterned electrode layer of FIG. 3a;

DESCRIPTION OF PREFERRED EMBODIMENTS

Figure 1:
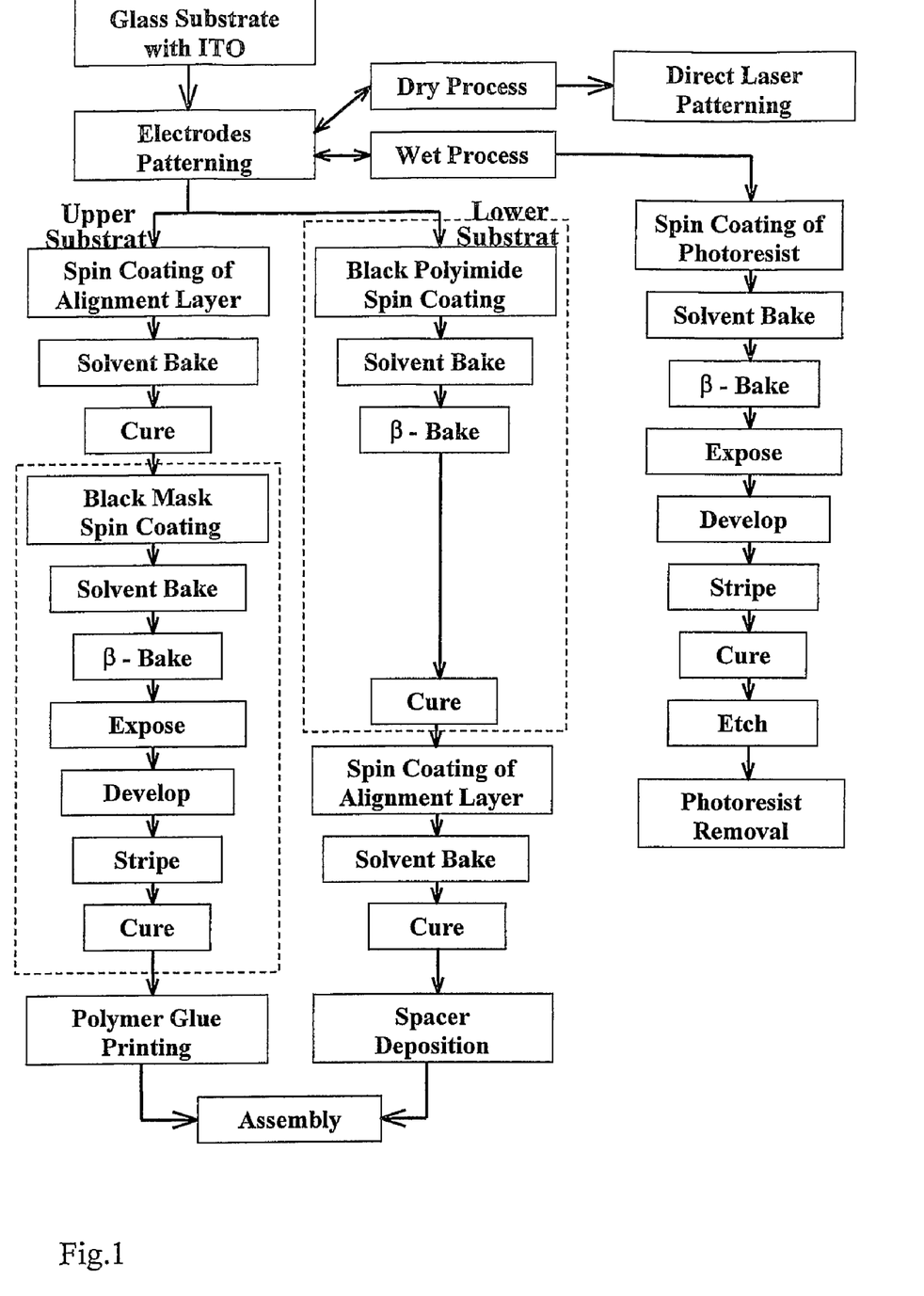
FIG. 1 is a schematic overview of the manufacturing steps used for conventional static drive stabilized cholesteric texture (SSCT) LCD.
Figure 2:
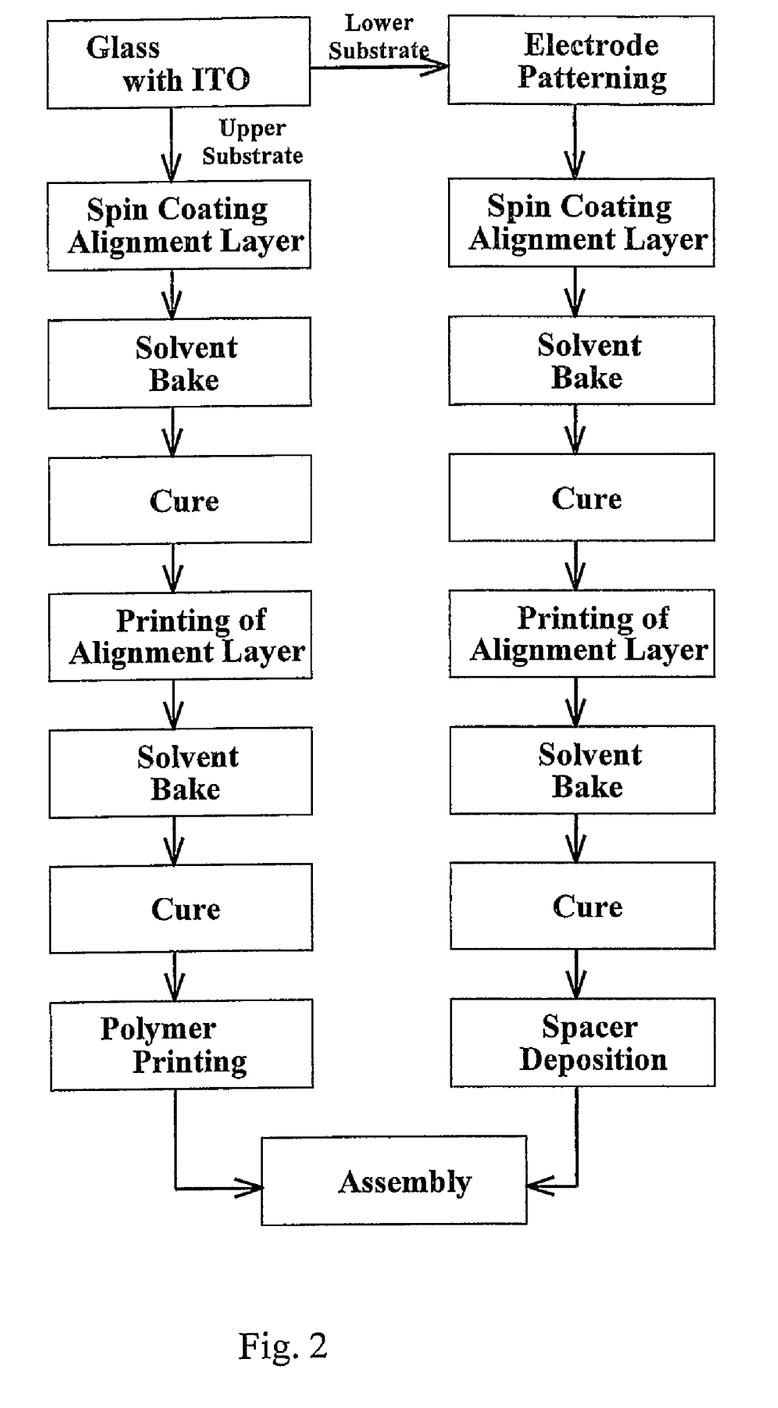
FIG. 2 is a schematic overview of the manufacturing steps used for a static drive stabilized cholesteric texture (SSCT) LCD in accordance with an embodiment of the invention.
Figure 3A:
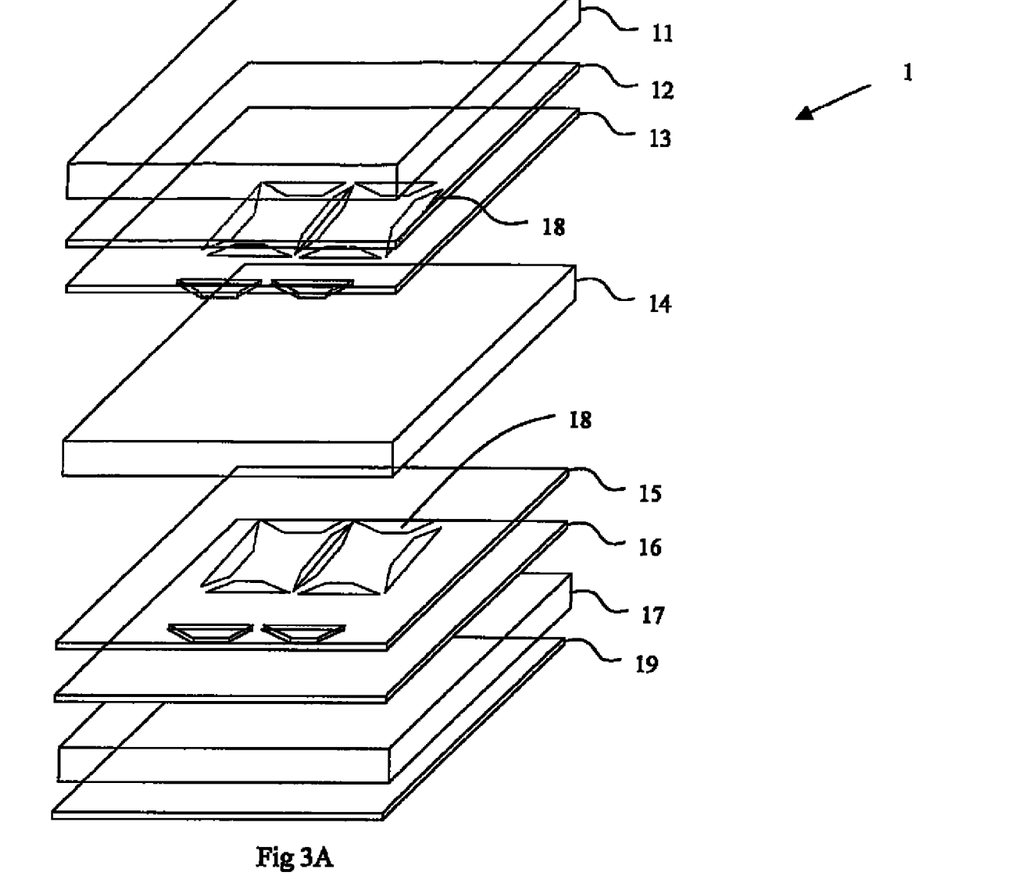
FIG. 3a is an exploded side view of a segmented liquid crystal device according to an embodiment of the invention.

Like reference numerals refer to like parts throughout the drawings. With reference to FIG. 3a, a liquid crystal device 1 according to one embodiment comprises a sandwich structure, consisting of the following layers, in the order from upper side, which in use of the display is closest to the viewer:

An upper display substrate 11.
An upper conductive electrode layer 12.
An upper alignment layer(s) 13.
An intermediate cholesteric liquid crystal layer 14.
A lower alignment layer(s) 15.
A lower conductive electrode layer 16.
A lower display substrate 17.
A surface pattern of an image to be displayed 18.
An optional light absorbing layer 19.

Accordingly, liquid crystal layer 14 is sandwiched between the other layers, which are arranged symmetrically around said liquid crystal layer. All the layers are essentially parallel to each other.

The display substrates 11 and 17, could be the plates of glass, plastic or the like. At least the upper substrate 11 is transparent.

The conductive layers 12, 16, serving as electrodes, could be formed of indium tin oxide (ITO), or other conductive materials, for instance, polyethylene-dioxytiophen (PEDOT). These layers are further connected to electric circuitry (not shown) for applying driving voltages to said layers. At least the upper conductive layer 12 is transparent. If the display is used as a transmissive LCD, the lower conductive layer 16 should also be transparent. However, for reflective LCDs, the lower conductive layer 16 is preferably essentially opaque. This could be accomplished by using a light-absorbing material, for instance Cu/CuO. Alternatively or additionally, a separate light absorbing layer may be arranged on the conductive layer, e.g. light-absorbing dielectrics or alike. Alternatively or additionally, the lower substrate 17 may be of light-absorbing material or covered with a light absorbing material.

The alignment layers 13, 15, could e.g. be made of various types of polyimides (PI), organic or inorganic dielectrics, for instance, silicon monoxide.

On the alignment at least one of the lower or upper alignment layer 13 and 15, and possibly on both, and preferably on the boundary to the liquid crystal 14, a patterned non-conductive or passive dielectric material mask 18 is arranged. The mask defines image elements on the display, which comprise at least part of an image to be presented on the display.

The layer of patterned material could be formed as a separate layer on the substrate surface, the rest of the substrate being of different material. The surface patterning can be performed utilizing e.g. conventional techniques like offset printing, flexography printing, thermal transfer, photolithography, silk screen or inkjet printing techniques. Alternatively, the layer of patterned non-conductive or passive dielectric material could be formed as a surface modification of the substrate. Such a selective modification could be accomplished in different manners, e.g. by means of mechanical, chemical (electrochemical, photochemical), or physical (thermal, plasma or vacuum) treatment etc.

The intermediate cholesteric crystal layer 14 is preferably cholesteric (chiral nematic) liquid crystals substantially free of polymer additives. Furthermore, the liquid crystal material is preferably arranged to form in display cell at least two stable states at zero field: planar and focal conic, which could be transformed by external electric field.

Preferably, at least the upper conductive layer 12 comprises an essentially un-patterned area, and preferably forms an essentially solid electrode area. For applications where the liquid crystal device has a plurality of display segments, it is preferred that the lower conducting electrode 16 comprises several essentially un-patterned electrode areas, said electrode areas preferably covering essentially the whole area of said display segments, wherein the electrode areas are independently controllable in order to allow independent switching of different display segments. This patterning could be achieved e.g. by arranging thin dielectric stripes 163 sufficient to separate the neighboring electrically conductive areas. The patterning could preferably be provided by laser patterning technique.

Figure 3B:
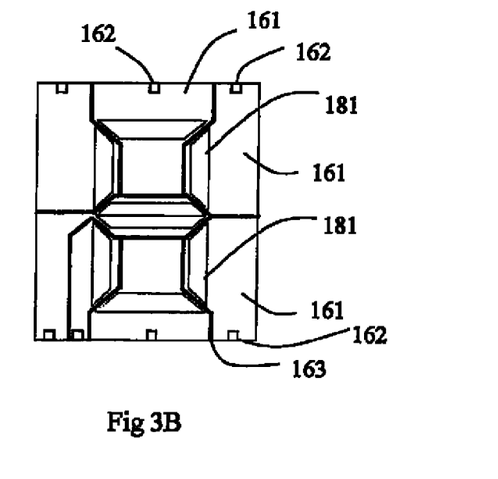

An exemplary design of a patterned electrode is illustrated in FIG. 3*b*. In this design separate electrode areas 161 are formed by the arrangement of separating dielectric lines 163 between them. Each electrode area 161 comprises an electric contact pad 162, to be connected to a driving circuitry (not shown). Hereby, the electrode areas are individually controllable, in order to activate separate display segments, and consequently to display different image elements 181 of the mask pattern 18.

For the production of the liquid crystal display device as discussed above, various production methods may be employed. An exemplary production method will now be discussed.

EXAMPLE 1

Two standard soda lime polished glass plates 40 mil thick coated with ITO (Merck Display Technologies Ltd.) form the upper and lower substrates. The upper and lower substrates having solid electrode were spin coated using commercially available polyimide SE-1211 from Nissan Chemical Industries Ltd., prebaked at 80° C. and then cured at 180° C. during an hour. The resulting polyimide film has approximately 35-50 nm thickness and provides isotropic homeotropic alignment of LC molecules at the interface. Then the lower substrate was selectively coated using flexography printing technique with polyimide SE-2170 (Nissan Chemical Industries Ltd.), prebaked at 80° C. and cured afterwards at 200° C. during an hour. Above mentioned polyimide layer forms the image mask of approximately 100 nm thick. The alignment of LC at the LC interface covered by SE-2170 is low tilt amorphous planar. The polymer glue NOA-68 (from Norland Products Inc.) has been dispensed onto the lower substrate. The spacers (Licristar 45, Merck KGaA) were sprayed onto the upper substrate surface and two substrates were assembled to form a display cell following by UV curing of the polymer glue under air pressure. Then the display cell was vacuum filled with liquid crystals in its isotropic phase cooled down and edge sealed. At the end the backplane of lower substrate was painted with black light absorbing paint. The cell gap was selected around 4.5 microns to fit the optimum optical properties of cholesteric LCD operating in the reflective mode as well as physical properties of LC material. Liquid crystal material used for our display comprises a mixture of commercially available chiral nematic multi bottle system BL087/BL088 (Merck Ltd.) in proportion around 15/85. The resulting mixture has the helical pitch adjusted to reflect the visible light in yellow-green spectrum region. Above described LCD could be driven independently with both driving techniques described below employing voltage dissipation principle at the surface pattern mask, difference between critical CN transition for planar and homeotropic alignment and the driving principle which employ the difference between nucleation velocities for differently patterned sites of the surface. In the last case both surfaces preferably could be patterned in the same manner to fasten the nucleation process.

EXAMPLE 2

The other method differs from Example 1 by the enhanced contrast ratio, which is gained by making electrodes of lower substrate light absorbing. This example is represented in multipixel design.

A standard soda lime glass polished plate 1.1 mm thick coated with ITO form the upper substrate. The lower glass substrate has a vacuum deposited V/Cu layer. The thickness of copper layer was raised by galvanic technique and eventually oxidized in high temperature alkaline solution to form a black CuO layer. The black electrode was patterned afterwards using YAG:Nd solid state laser to form the separate electrode segments. The upper and lower substrates were spin coated with SUNEVER series polyimide SE-1211, prebaked at 80° C. and cured at 180° C. during an hour. The resulting polyimide film has approximately 35-50 nm thickness and provides homeotropic alignment. Then the lower substrate was selectively coated using flexography printing technique with polyimide SE-2170, prebaked, and finally cured at 200° C. during an hour. Above mentioned polyimide layer forms the planar alignment image mask of approximately 100 nm thick. Following by the polymer glue dispensing onto the lower substrate and spacers deposition onto the upper substrate surface, two substrates were assembled, UV cured and sandwiched around liquid crystals to form a display cell. The cell gap was selected around 4.5 microns to fit the optimum optical properties. Liquid crystal material used for display comprises a mixture of BL087/BL088 in proportion around 15/85. The resulting mixture has the helical pitch adjusted to reflect the visible light in yellow-green spectrum region. In this configuration the display cell does not require optional black painting to operate and could be driven using the same driving principles as referred to in Example 1.

EXAMPLE 3

This example refers to non SSCT device employing surface modification as a patterning method.

Two standard soda lime polished glass plates coated with ITO form the upper and lower substrates. The both substrates, having solid electrode, were spin coated using commercially available polyimide SE-130 (Nissan Chemical Industries Ltd.), prebaked at 80° C. and then cured at 200° C. during an hour. The resulting polyimide film has approximately 50 nm thickness and provides isotropic low tilt planar alignment of LC molecules at the interface. Then both upper and lower substrates were spin coated with photoresist (Shipley S1818) and processed in the standard manner to form the mirror image photoresist masks on top of opposite substrates. All substrates were mechanically rubbed then and photoresist masks were removed afterwards with an appropriate solvent resulting in select surface modification on top of each substrate. Above mentioned surface modification of polyimide layer forms the image mask of rubbed and non-rubbed sites. Following by the polymer glue dispensing onto the lower substrate and spacers deposition onto the upper substrate surface, both substrates were assembled, aligned to put into coincidence mirror surface patterns, UV cured and sandwiched around liquid crystals to form a display cell. At the end the backplane of lower substrate was painted with light absorbing black paint. In above described configuration the display cell is backplane painted but eventually could be designed with embedded black absorbing electrodes similar to the way described in Example 2. The cell gap is selected around 5.0 microns to fit the optimum optical properties of selected liquid crystals. Liquid crystal material used for display comprises a mixture of BL087/BL088 in proportion around 23/77. The resulting mixture has the helical pitch adjusted to reflect the visible light in red spectrum region. Cholesteric LCD made according to a method described above can be switched between Grandjean perfect planar texture, focal conic texture and polydomain planar texture with scattered distribution of local helical axes. The peculiarities of optical contrast between those textured described in details in A. Kozachenko et. al. Functional Materials v. 7,#4 (2000). Above described LCDs could be driven using both standard driving methods known in the art and driving methods disclosed below.

EXAMPLE 4

Two standard soda lime polished glass plates 40 mil thick coated with ITO (Merck Display Technologies Ltd.) form the upper and lower substrates. The upper substrate a having solid electrode was spin coated using commercially available polyimide SE-1211 from Nissan Chemical Industries Ltd., prebaked at 80° C. and then cured at 180° C. during an hour. The resulting polyimide film has approximately 35-50 nm thickness and provides homeotropic alignment of LC molecules at the interface. The lower substrate was spin coated using commercially available polyimide SE-130 from Nissan Chemical Industries Ltd., prebaked at 80° C. and then cured at 200° C. for an hour. The resulting polyimide films have approximately 25-30 nm thickness and provide degenerated planar alignment of LC molecules at the interface. Then the lower substrate was selectively coated according to a thick pattern alignment mask using flexography printing technique with polyimide SE-7511L (Nissan Chemical Industries Ltd.), prebaked at 80° C. and cured afterwards at 180° C. during an hour. Above mentioned polyimide layer forms the image mask of approximately 300-500 nm thick. The alignment of LC at the boundary interface covered by SE-7511L is homeotropic. The polymer glue NOA-68 (from Norland Products Inc.) has been dispensed onto the lower substrate. The spacers were sprayed onto the upper substrate surface and two substrates were assembled to form a display cell following by UV curing of the polymer glue under air pressure. Then the display cell was vacuum filled with liquid crystals in its isotropic phase cooled down and edge sealed. At the end the backplane of lower substrate was painted with black light absorbing paint. The cell gap was selected around 6.2 microns. Liquid crystal material used for that display comprises a mixture of commercially available chiral nematic multi bottle system BL087/BL088 (Merck Ltd.) in proportion around 10/90. The resulting mixture has the helical pitch adjusted to reflect the visible light in green spectrum region. The display described above allows to implement at least four stable optical states employing sequentially two driving schemes described below. Among the possible optical states are: a)whole area is in the reflective state, b)whole area is in the slightly scattering state, c)slightly scattering image on reflective background and d)reflective image on slightly scattering background. The intermediate states (shades) are also possible. The switching into the optical state (c) is provided employing dielectric loss principle (thicker PI film introduces higher dielectric losses) whereas the switching into the optical state (d) is provided employing the difference between nucleation velocities for differently patterned sites of the surface (focal conic texture grows faster at the sites with planar PI alignment boundary). Driving of the LCD The liquid crystal display device in the embodiments discussed above could be operated according to various driving schemes.

Figure 4A:
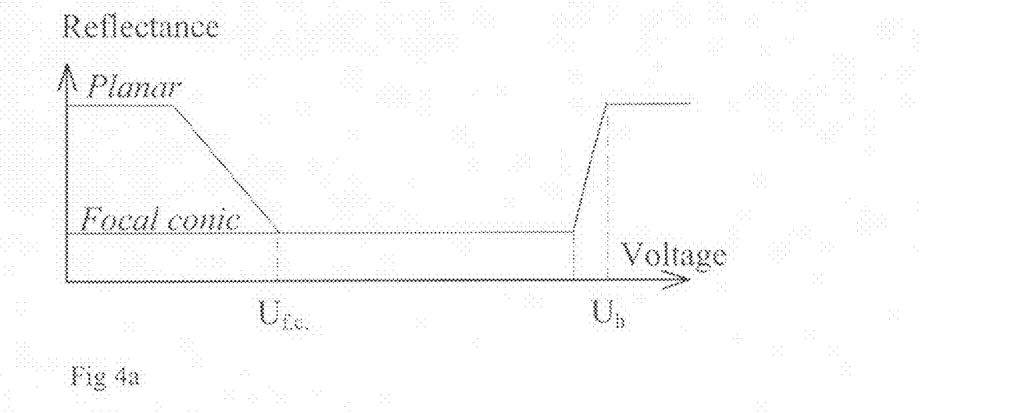
FIG. 4a-c is a schematic representation of electro-optical response and sequence of driving waveforms of a reflective cholesteric LCD in accordance with the invention.
Figure 4B:
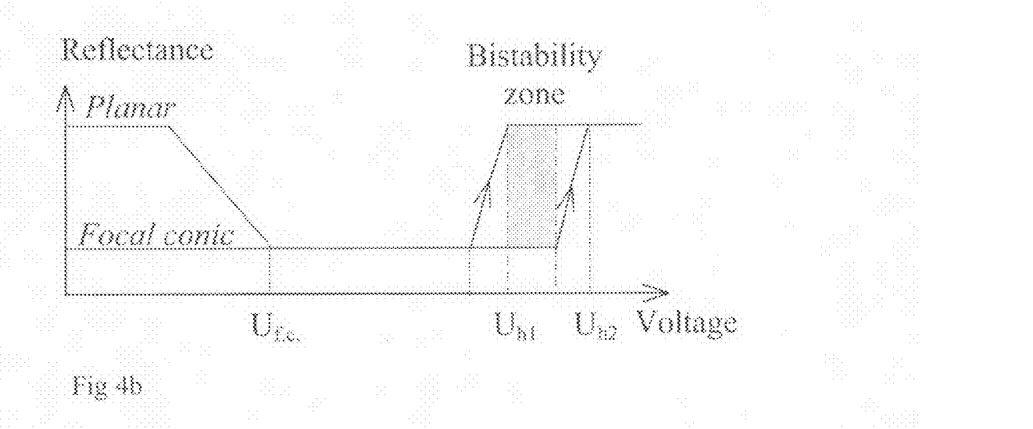
Figure 4C:
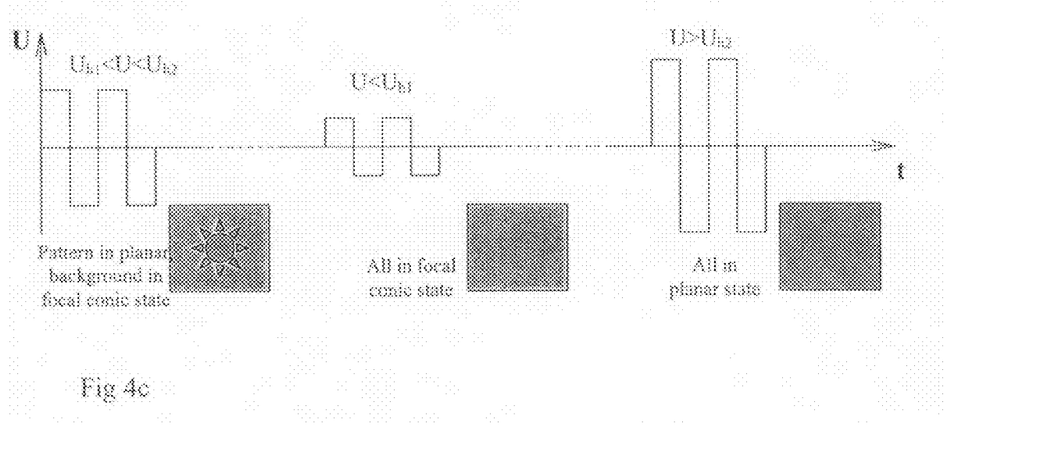

For instance, a first exemplary driving technique utilizes the gap between critical CN transition fields for planar and homeotropic boundary conditions. The typical electro-optical response of reflective cholesteric display is schematically represented on FIG. 4a. The figure shows the reflectance at zero field after applied electric field that has abruptly switched off at zero field point. The curves represent evolution process for two initial stable textures i.e. planar and focal conic. If superimposing the schematic electro-optical response curves for homeotropic and planar alignment in the same cell, the result will be the discrepancy between critical field of CN transition. This fact leads to a dynamic bistability zone formation depicted in FIG. 4b. The same effect is observed when additional dielectric losses are introduced by the passive dielectric layers. Following the schematic representation of FIG. 4b one can distinguish three various states of the display. Application of voltage under a level $U_{h1}$ will result in appearance of weakly scattered focal conic texture at the whole electrodes cross section square. The whole square will be in a reflective planar state when the voltage exceeds $U_{h2}$. Finally, a picture that corresponds to a surface patterning will be seen when the voltage $U_{h1} < 0 < U_{h2}$ is applied. However, more complex cases producing gray scale are also possible.

A second exemplary driving technique employs the properties of relaxation in cholesteric liquid crystals before and after surface treatment as well as in the various alignment layers. It is known that the reverse NC transition is a nucleation phenomenon. The nucleation velocity is in a strong dependence from nucleation sites concentration, which, in fact, is different for various alignment layers. This may result in the temporal gap between relaxations from homeotropic to focal conic texture for various boundary conditions. In order to explain how this driving technique works we should put into consideration hysteresis properties of each cholesteric system comprised of cholesteric LC layer confined between the alignment layers. Static hysteresis is obtained as electro optical response upon application of a quasi static AC electric field to LC with the duration time approaching ideally infinity. Dynamic hysteresis is a dynamic electro-optic response curve obtained upon application of AC electric field to LC with the very limited duration time.

Figure 5A:
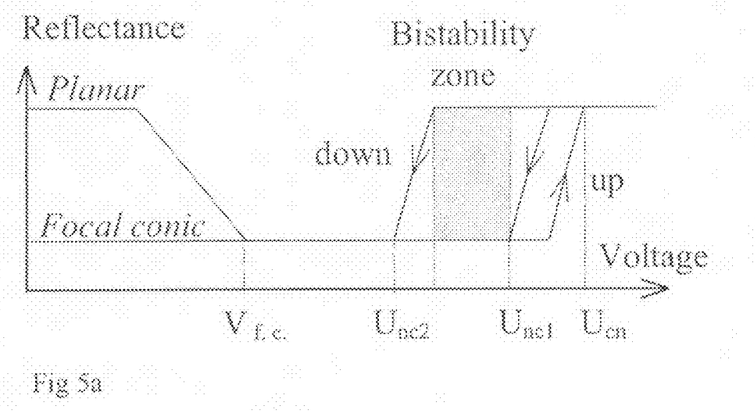
FIG. 5a-b is a further schematic representation of electro-optical response and kinetics of a nucleation process (a), and for various alignment layers (b), in a cholesteric LCD in accordance with the invention.
Figure 5B:
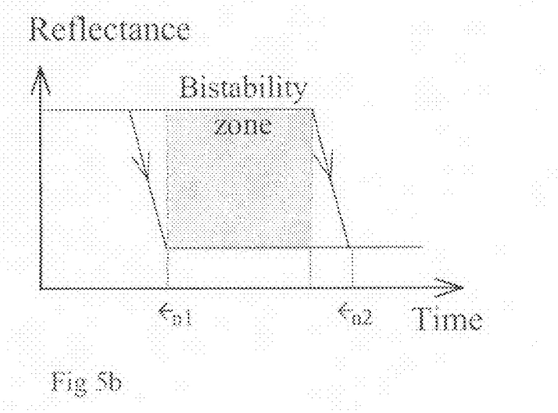
Figure 6:
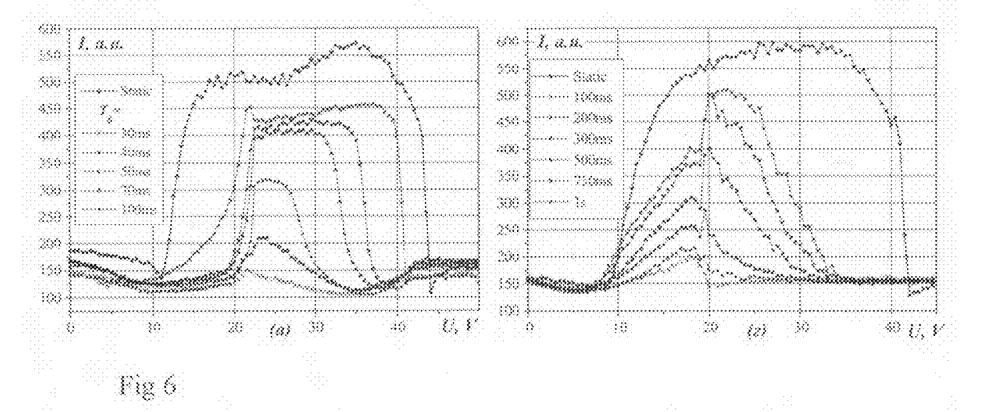
FIG. 6 is a representation of dynamic electrooptical response curves of a cholesteric LCD (d=6 μm) obtained by means of transmission technique. The left hand diagram illustrates a non-rubbed PI-alignment layer and the right hand diagram illustrates a silicon monoxide alignment layer.
Figure 7:
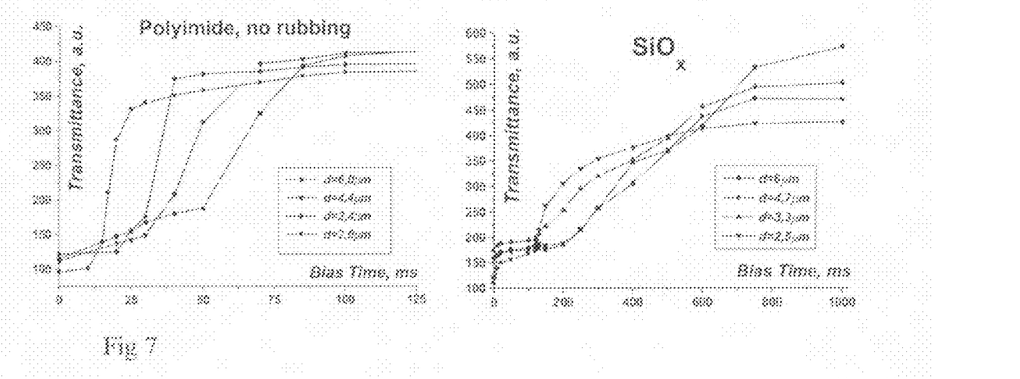
FIG. 7 is a representation of kinetics of a nucleation process in a cholestric system for various alignment layers and cell thicknesses (transmittance mode)
Figure 8:
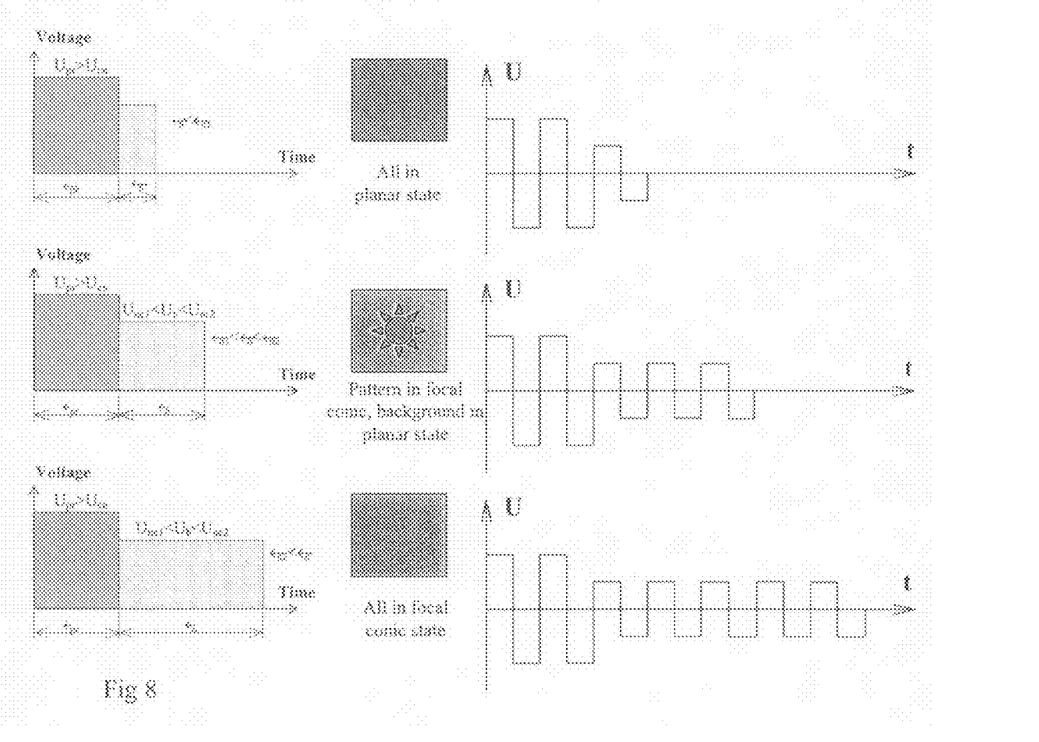
FIG. 8 is a representation of sequences of driving waveforms of reflective cholesteric LCDs employing nucleation phenomenon under fixed bias field.

Schematic representations of two superimposed dynamic electro-optical response curves for two different alignment layers are depicted in FIG. 5a. The curves under the label "down" show the reflectivity of cholesteric texture when the bias voltage $U_b$ from the field induced homeotropic state was applied for a fixed bias time $T_b$ and then turned off quickly. The label "up" corresponds to a conventional static elctro-optical response curve of SSCT. As it could be seen there is a gap between the critical voltages for NC transition at the various boundaries, which creates a bistability zone. These curves can be transferred onto a time scale showing the nucleation kinetics (see FIG. 5b) under the fixed bias field (bias voltage). Both dynamic electro-optical response curves and the maximum nucleation velocity are shown in FIG. 6 and FIG. 7 for the real samples, respectively. Pictures on FIG. 5a and FIG. 5b show at least two ways to control cholesteric textures. Firstly, via the variation of applied bias voltage under the fixed bias time. Secondly, via the variation of bias time at the fixed bias voltage. Both schemes are found in good working conditions, however the second way is easier and cheaper to realize on practice. The details of the principle are clearly demonstrated in FIG. 8.

CONCLUSIONS

Contemporary market of LCDs requires additional challenges on image quality and display cost. A significant cost reduction is associated with display technology simplification. It has for that reason been suggested in the present application a new concept in cholesteric LCD design. Broadly, the present invention pertains to a cholesteric liquid crystal device, a method for producing such the same and a principle of electronic driving for such display device, where conductive electrode(s) remains essentially unpatterned and the displaying image is formed by patterning of the alignment layer(s). The main idea lies in the very fact that both focal conic and planar texture could be controlled using some peculiarities of surface interactions of LC molecules with the solid boundary. Then the image features of the display are defined by the inclusion of a layer of patterned non-conductive or passive dielectric material on at least one of the substrates, where said patterned material is forming a mask defining image elements of the display segments. In such way the patterning of conductive electrode(s) could avoided or at least simplified.

Specific embodiments of the invention have been described in the foregoing. However, several alternatives are possible, as would be apparent for someone skilled in the art. For example, different materials than those specifically mentioned could be used for the various layers, additional layers may be incorporated in the structure, the LCD need not be planar, but could e.g. be slightly curved, combination of methods described above could be used etc.

Such and other obvious modifications must be considered to be within the scope of the present invention, as it is defined by the appended claims. It should be noted that the above-mentioned embodiments illustrate rather than limit the invention, and that those skilled in the art will be able to design many alternative embodiments without departing from the scope of the appended claims.

The invention claimed is:

1. A liquid crystal device with at least one display segment, comprising:
    a first transparent display substrate having a transparent alignment layer thereon including a layer of patterned non-conductive or passive dielectric material, said patterned material forming a mask defining image elements of the display segments, wherein said display segments comprise at least part of an image to be presented on said display;
    a second display substrate;
    a layer of cholesteric liquid crystal material disposed between said first and second substrate; and
    a layer of conductive material arranged on each of said substrates, said conductive layers forming electrodes for applying an electric field across the liquid crystal for providing switching in the liquid crystal material between at least two different optical states, wherein the electrodes of the conductive layers and the patterned non-conductive or passive dielectric material of said first transparent display substrate are arranged to at least partly overlap each other.

2. The liquid crystal device of claim 1, wherein the layers of conductive material are arranged as a coating on the side of the substrates facing the cholesteric liquid crystal material, and the layer of patterned non-conductive or passive dielectric material of the first substrate being arranged between the layer of conductive material and the layer of cholesteric liquid crystal material.

3. The liquid crystal device of claim 1, wherein the layer of conductive material of the first substrate is covered with at least the alignment layer and assembled in a sandwich construction with the layer of patterned non-conductive or passive dielectric material arranged to face the layer of cholesteric liquid crystal material and wherein the layer of conductive material of the second substrate is covered with at least a second alignment layer and assembled in a sandwich construction with the layer of patterned non-conductive or passive dielectric material arranged to face the layer of cholesteric liquid crystal material.

4. The liquid crystal device of claim 1, wherein the cholesteric liquid crystal material is substantially free of polymer additives.

5. The liquid crystal device of claim 1, wherein the volume content of polymer additives in the cholesteric liquid crystal material is less than 5%.

6. The liquid crystal device of claim 1, wherein the second display substrate includes a layer of patterned non-conductive or passive dielectric material thereon, said patterned material forming a mask defining image elements of the display segments, wherein said display segments comprise at least part of an image to be presented on said display.

7. The liquid crystal device of claim 1, said device having a plurality of display segments, wherein at least one of the layers of conductive material disposed on said substrates comprises several essentially un-patterned electrode areas, said electrode areas covering essentially the whole area of said display segments, wherein the electrode areas are independently controllable in order to control different display segments.

8. The liquid crystal display device of claim 1, wherein the layer of patterned non-conductive or passive dielectric material is formed as a separate layer on the substrate surface, the rest of the substrate being of a different material.

9. The liquid crystal device of claim 1, wherein the layer of patterned non-conductive or passive dielectric material is formed as a surface modification of the substrate by means of mechanical, chemical or physical treatment.

10. The liquid crystal device of claim 1, further comprising at least one intermediate alignment layer provided between the layer of cholesteric liquid crystal material and the display substrate(s).

11. The liquid crystal device of claim 1, wherein the device comprises a sequence of layers of patterned non-conductive or passive dielectric material with different image patterns stacked over each other to form a three dimensional relief.

12. The liquid crystal device of claim 1, wherein the layer of patterned non-conductive or passive dielectric material is arranged in direct contact with the layer of cholesteric liquid crystal material and further arranged to modify the anchoring properties of at least one of the electrodes in relation to the cholesteric liquid crystal material.

13. A method of making a liquid crystal device having at least one display segment, comprising the steps:
providing first and second display substrates;
disposing a layer of conductive material on each of said substrates, said conductive layers forming electrodes for applying an electric field across a liquid crystal for switching the liquid crystal material between at least two different optical states;
arranging a transparent alignment layer on said layer of conductive material on at least one of said substrates;
arranging a layer of patterned non-conductive or passive dielectric material in the substrate having said alignment layer, said patterned material forming a mask defining image element of the display segments, wherein said display segments comprise at least part of an image to be presented on said display; and
disposing a layer of cholesteric liquid crystal material between said first and second substrates,
wherein the electrodes of the conductive layers and the mask of said substrate are arranged to at least partly overlap each other.

14. The method of claim 13, wherein the layer of patterned non-conductive or passive dielectric material is formed as a separate layer on the substrate surface, of a different material than the rest of the substrate, by at least one of: offset printing, flexography printing, thermal transfer, photolithography, and silk screen or inkjet printing techniques.

15. The method of claim 13, wherein the layer of patterned non-conductive or passive dielectric material is formed as a surface modification of the substrate by modifying the substrate surface mechanically, chemically (electrochemical, photochemical), and/or physically (thermal, plasma or vacuum).

16. A process for forming a display comprising applying a driving voltage on the liquid crystal device of claim 1 by employing a difference between the critical field for cholesteric-nematic transition for differently patterned areas of the display.

17. A process for forming a display comprising applying a driving voltage on the liquid crystal device of claim 1 by employing hysteresis properties and a difference in nucleation velocity for reverse nematic to cholesteric transition for differently patterned areas of the display.

18. The liquid crystal device of claim 2, wherein the layer of conductive material of the first substrate is covered with at least the alignment layer and assembled in a sandwich construction with the layer of patterned non-conductive or passive dielectric material arranged to face the layer of cholesteric liquid crystal material and wherein the layer of conductive material of the second substrate is covered with at least a second alignment layer and assembled in a sandwich construction with the layer of patterned non-conductive or passive dielectric material arranged to face the layer of cholesteric liquid crystal material.

19. The liquid crystal device of claim 1, wherein the volume content of polymer additives in the cholesteric liquid crystal material is less than 1%.

20. The liquid crystal device of claim 1, wherein the volume content of polymer additives in the cholesteric liquid crystal material is less than 0.1%.

* * * * *